May 7, 1963 J. A. FLEMING 3,088,566
ACCESSORY DRIVE MECHANISM
Filed Sept. 13, 1960

INVENTOR.
Jack A. Fleming
BY
P. L. Spencer
ATTORNEY ns to United States Patent Office 3,088,566
Patented May 7, 1963

3,088,566
ACCESSORY DRIVE MECHANISM
Jack A. Fleming, Pewamo, Mich., assignor to General Motors Corporation, Detroit, Mich., a corporation of Delaware
Filed Sept. 13, 1960, Ser. No. 55,642
2 Claims. (Cl. 192—58)

This invention relates to an accessory drive for driving accessories normally used in connection with motor vehicles and more particularly to a hydraulic drive arrangement for limiting the maximum speed of rotation of such accessories.

In the operation of motor vehicles it has been found that excess power consumption and unnecessary noise results from driving the vehicle accessories such as the generator, power steering pump, air conditioning pump, generator and engine cooling fan at speeds higher than required, particularly when the vehicle is operated at relatively high speed on a highway.

An object of this invention is to provide an accessory drive mechanism automatically operable to limit the maximum speed of rotation of vehicle accessories with respect to the speed of rotation of a power input shaft.

A further object of this invention is to provide a speed limiting device of the type described which is of simple low cost construction and readily adaptable for use in motor vehicles.

Another object of this invention is to provide a speed limiting device for limiting the maximum speed of rotation of vehicle accessory mechanism capable of operating under slipping conditions and having a long useful life without requiring frequent servicing.

An additional object of this invention is to provide a speed limiting drive mechanism of the type described particularly adapted to be installed in motor vehicles already in use and made up of an assembly of low cost parts.

These and other objects and advantages of this invention will be apparent from the following description and claims, taken in conjunction with the following drawings in which:

Figure 1:
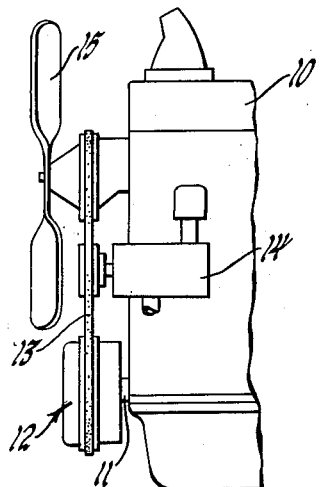
FIGURE 1 is a schematic drawing of an accessory drive mechanism constructed in accordance with the principles of this invention showing the drive mechanism installed on a vehicle engine.

Referring to FIGURE 1, there is shown an engine 10 for driving a shaft 11 having a speed limiting drive mechanism 12 constructed in accordance with the principles of this invention mounted thereon. A belt 13 driven by unit 12 drives a power steering pump 14 and a fan 15. Additional or other accessories than those shown such as, for example, a generator air compressor or an air conditioning refrigerant compressor may be driven by unit 12.

Figure 2:
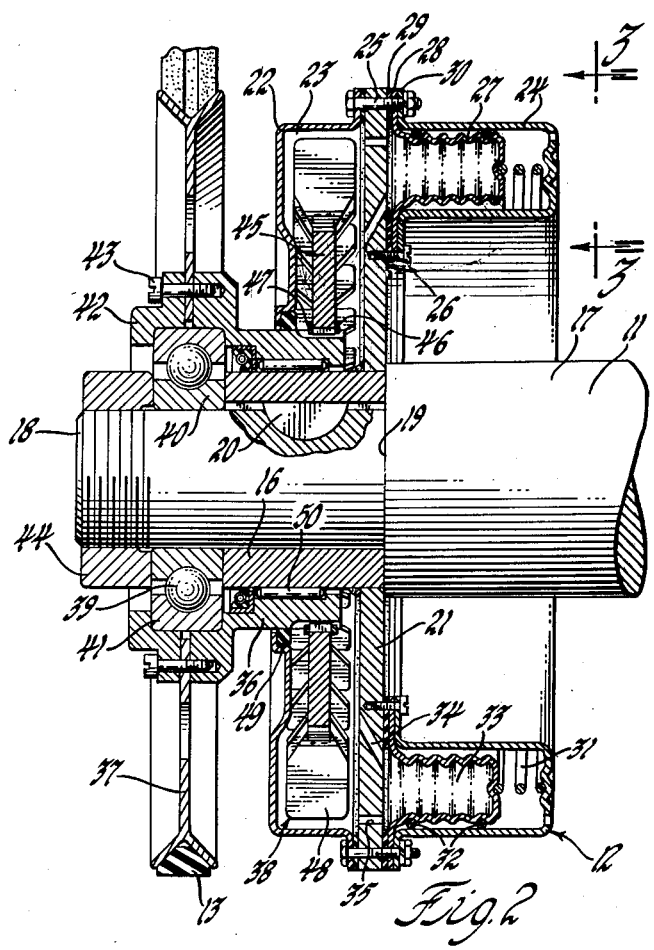
FIGURE 2 is a partially sectional view through the drive assembly illustrating the relationship of the parts.
Figure 3:
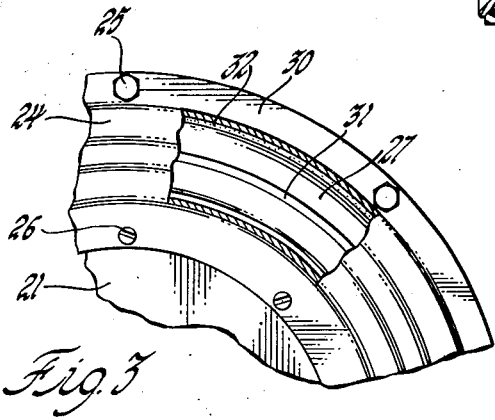
FIGURE 3 is a sectional view taken along the line 3—3 of FIGURE 2.

Referring to FIGURE 2, shaft 11 may constitute an extension of the engine crankshaft or camshaft or may be another shaft driven by the engine 10 of FIGURE 1, but is illustrated in its preferable form as an extension of the engine crankshaft. Shaft 11 is provided with a relatively large diameter section 17 and a relatively small diameter section 18 having a shoulder 19 therebetween. A sleeve 16 is keyed to shaft section 18 by means of a key 20, the sleeve 16 having one end thereof abutting shoulder 19 and carrying an upstanding disc support flange 21 fixed to the sleeve for rotation therewith. One edge of disc 21 abuts shoulder 19 at the base of the disc for rigid support of the disc.

At the base of this disc 21 at the opposite side of the disc from shoulder 19, the disc is welded to sleeve 16. Disc 21 may be formed of a simple metal stamping for low cost manufacture. At one side of disc 21 a cover 22 formed of a sheet metal stamping is carried by the disc and encloses a working chamber 23 adapted to contain working fluid. A second cover 24 formed of a sheet metal stamping is supported on disc 21 at the side of disc 21 opposite from cover 22. Bolts 25 serve to detachably secure both covers to the disc, there being a series of screws 26 for attaching the inner portion of cover 24 to the disc. A metallic bellows 27 is provided with an upstanding flange 28 at the open end of the bellows, the flange 28 being disposed between a washer 29 and a flange 30 on cover 24. The bellows and cover 24 are both mounted on disc 21 by bolts 25 and screws 26. A spring 31 seated upon cover 24 and the outer end of bellows 27 normally tends to compress bellows 27. A pair of rubber O-rings 32 extend around the outer periphery of bellows 27, the rings 32 being spaced axially on the bellows to support the bellows against deflection due to centrifugal force imparted thereto. Bellows 27 in cooperation with disc 21 encloses a chamber 33, to form an expansible and contractable fluid reservoir. Passages 34 and 35 in disc 21 provide continuous fluid communication between working chamber 23 and reservoir chamber 33.

A pulley drive hub 36 carries a pulley 37 adapted to drive belt 13 and a turbine 38 disposed in chamber 23. Hub 36 is supported on shaft section 18 by means of a large roller bearing 39 having its inner race 40 abutting the end of sleeve 16 and its outer race 41 contacting hub 36 and a bearing retainer 42 secured to hub 36 by bolts 43. A nut 44 retains the bearing, hub 36 and turbine 38 in assembled relationship. Hub 36 and sleeve 16 are of such axial length that turbine 38 will be automatically positioned in its proper position in chamber 23 in spaced relationship to cover 22 and disc 21 when nut 44 is tightened on shaft section 18. This facilitates quick and proper assembly of the unit and prevents defective assemblies allowing for the use of unskilled labor. Turbine 38 is made up of a central disc member 45 splined to hub 36 and held on the hub by snap rings 46 and 47. Disc 45 is slotted to receive a series of vanes 48, the vanes being formed of sheet metal stampings secured to the disc in any suitable manner as by welding.

A seal 49 is disposed between the inner periphery of cover 22 and hub 36 to prevent leakage of fluid from chamber 23. A needle bearing 50 disposed between hub 36 and sleeve 16 assists bearing 39 to rotatably support the assembly of pulley 37, hub 36 and turbine 38 for rotation without wobble or undesirable deflection. Bearing 39 is disposed directly beneath pulley 37 and needle bearing 50 is disposed directly beneath turbine 38 to provide firm rotatable support for the pulley and turbine.

In operation of the assembly shaft 12 constitutes a power input shaft for rotating the disc 21, cover 22, cover 24, and bellows 27 as a unit. Working fluid contained in working chamber 23 will rotate with rotation of housing cover 22 thereby causing turbine 38 to rotate and drive pulley 37 through hub 36. Openings 34 and 35 in disc 21 maintain working chamber 23 in continuous hydraulic connection with chamber 33 of the variable capacity reservoir for free flow of fluid therebetween. With shaft 11 at rest, spring 31 will partially collapse the bellows. As shaft 11 speeds up due to acceleration of the vehicle engine, chambers 23 and 33 are rotated at such increased speed such that fluid in chamber 23 has centrifugal force applied thereto and is thrown radially outwardly and rotates at a speed of rotation tending to approach the speed of rotation of cover 22. Turbine 38 due to its load applied thereto by belt 13 tends to drag in the rotating fluid and extracts energy therefrom whereby the turbine is effective to drive pulley 13. Centrifugal force applied to fluid in chamber 23 will tend to force the fluid through openings 34 and 35 into reservoir chamber 33, thereby tending to expand the bellows 27. Such expansion is opposed by spring 31. In its partially collapsed position, the volume of reservoir chamber 33 is less than the volume of fluid in working chamber 23. With bellows 27 fully expanded, the volume of chamber 33 will be sufficient to hold all of the fluid from chamber 23. Thus it is not possible to rupture bellows 27 by over-filling the bellows with fluid.

At rest, spring 31 will collapse bellows 27 a sufficient amount to force fluid from chamber 33 through openings 34 and 35 in disc 21 into working chamber 23. As disc 21 is accelerated, centrifugal force applied to fluid in chamber 23 due to rotation of the chamber will force fluid into reservoir chamber 33. Within the range of expansion of bellows 27, spring 31 will permit the bellows to expand to receive fluid from chamber 23, the spring applying an axial thrust to the bellows opposing the axial thrust applied to the bellows by fluid tending to enter chamber 33. In this range of operation the quantity of fluid contained in chamber 33, and consequently the quantity of fluid remaining in chamber 23 is determined by the centrifugal force applied to the fluid and the action of spring 31. Spring 31 may be any one of a series of springs of different weight or calibration to provide any one selected rate of expansion of bellows 27, to provide any desirable operating characteristic. At some speed of rotation of disc 21, sufficient quantity of fluid will enter chamber such that irrespective of any increase in speed of rotation of disc 21, turbine 38 will be unable to further increase the speed of rotation of pulley 37. The device thereby limits the maximum speed of rotation of the vehicle accessories to a predetermined maximum desirable speed of rotation. As the speed of rotation of 23 decreases, spring 31 will progressively collapse bellows 27 to force fluid from chamber 33 to 23, thereby rendering the drive of impeller 38 more effective such that pulley 37 will tend to be driven at the maximum desirable speed so long as the speed of rotation of shaft 11 exceeds such speed.

The arrangement provides a smoothly operating automatic drive wherein the pulley 37 is driven at a maximum permissible speed and no faster so long as the speed of rotation of shaft 11 exceeds such maximum speed. The device is of economical construction and assures proper assembly without the use of skilled labor. The drive arrangement is capable of operation under slipping conditions over long periods of time without undue wear of the parts as would otherwise require frequent servicing.

I claim:

1. Drive mechanism for driving the accessories of an engine comprising an engine driven power input shaft, a disc driven by said shaft, a cover carried by said disc and forming therewith a working chamber, a turbine disposed in said chamber, working fluid in said chamber, a sleeve supporting said turbine for rotation in said chamber and driven by said turbine, power delivery mechanism driven by said sleeve, an expandable and collapsible member carried by said disc, a cover carried by said disc, a fluid passage through said disc providing continuous fluid communication between said working chamber and the interior of said expandable and collapsible member, and yieldable means normally urging said expandable and collapsible member toward its collapsed position.

2. Drive mechanism for driving the accessories of an engine comprising an engine driven power input shaft, an upstanding disc driven by said shaft, a cover carried by said disc and forming therewith a working chamber, working fluid in said chamber, a sleeve supported for rotation on said shaft and extending into said working chamber, a turbine in said working chamber for driving said sleeve, an expandable and collapsible member having an open end facing said disc and a closed end remote from said disc, a second cover supporting said expandable and collapsible member on said disc, a passage through said disc connecting said working chamber to the interior of said expandable and contractable member, and a spring seated upon said second cover and yieldably biasing said expandable and collpasible member toward its collapsed position.

References Cited in the file of this patent

UNITED STATES PATENTS

| | | |
|---|---|---|
| 1,192,233 | Severy | July 25, 1916 |
| 2,015,626 | Heath | Sept. 24, 1935 |
| 2,738,048 | Douglas | Mar. 13, 1956 |
| 2,902,127 | Hardy | Sept. 1, 1959 |
| 2,988,188 | Tauschek | June 13, 1961 |
| 3,011,607 | Englander | Dec. 5, 1961 |

OTHER REFERENCES

National Bureau of Standards Technical Report #1213 (Figure 25 relied on), March 1948.